United States Patent Office
3,096,286
Patented July 2, 1963

3,096,286
ESTERS OF AN OXYALKYLATED PHENOL-FORM-ALDEHYDE RESIN AS A LUBRICATING OIL DETERGENT
Joseph A. Verdol, Dolton, Ill., assignor, by mesne assignments, to Sinclair Research Inc., New York, N.Y., a corporation of Delaware
No Drawing. Filed Jan. 11, 1960, Ser. No. 1,425
3 Claims. (Cl. 252—57)

This invention relates to oleaginous base lubricants having improved dispersant properties. More particularly, it relates to lubricants containing certain organic esters, that is, a small amount of the esters of the condensation product of a phenol-formaldehyde resin with an alkylene oxide.

As is well-known in the art, straight or uncompounded mineral oils are often deficient in one or more respects for the particular use to which they are put. The present invention involves the discovery that an ester of the condensation product of a phenol-formaldehyde resin with an alkylene oxide when added to a lubricating oil provides a lubricant that has improved characteristics for dispersing solid materials appearing in the oil during use and thus reduces deposition of such materials on engine parts. Chemical compounds which are known for their function of enabling a lubricating oil medium to maintain oxidation products, resins, and other types of insoluble material in suspension or dispersion in the oil are lubricating oil detergent additives.

I have found that an ester of the condensation product of a phenol-formaldehyde resin with alkylene oxide in lubricating oil is effective in solubilizing or dispersing in the oil solids of the type that are normally formed during use in an internal combustion engine. The oil-soluble esters of the condensation product of a phenol-formaldehyde resin with an alkylene oxide usable in the lubricants of this invention are believed to be exemplified by the following formula:

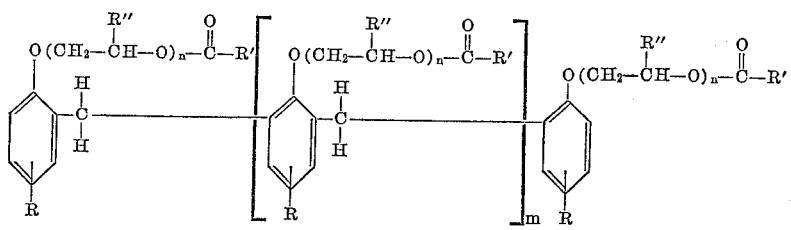

wherein:

n=about 1 to 10, preferably about 2 to 4;
m=about 0 to 10, preferably at least 1;
R=an alkyl group, including cycloalkyl, straight or branched chain having about 4 to 15 carbon atoms;
R'=an alkyl group, including cycloalkyl, straight or branched chain having about 5 to 23 carbon atoms, preferably about 11 to 19;
R''=hydrogen or lower alkyl of up to about 2 carbon atoms, i.e. the

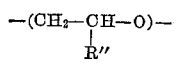

group is an alkylene oxy radical of 2 to about 4 carbon atoms.

It can be seen that R' taken with its attached carbon atom is part of an acyl radical of about 6 to 24, preferably about 12 to 20, carbon atoms.

In general, the dispersant of the invention which is useful in maintaining sludge and varnish formations suspended in the oil is prepared by reacting, in the designated ratios, of about 1 mole of an alkylated phenol, preferably p-alkylated, in which the alkyl group contains from about 4 to 15 carbon atoms, about 0.5 to 2 moles of formaldehyde or its polymers which yield formaldehyde; about 1 to 10, preferably not more than about 4, moles of an alkylene oxide having 2 to about 4 carbon atoms and about 0.7 to 1.5 moles of a fatty acid or its ester, the residue (the carbon chain attached directly to the carboxyl carbon atom) of said acid containing from about 5 to 23, preferably about 11 to 19, carbon atoms, to form the ester of the alkylene oxide-phenol-formaldehyde condensation product. In the preferred reaction procedure the phenol and formaldehyde are reacted to give a resin which is then oxyalkylated. The resulting intermediate product is esterified with the fatty acid or its esters.

Suitable phenolic reactants include the following: para-tertiarybutylphenol; para-secondarybutylphenol; para-hexylphenol; para-isooctylphenol; para-nonylphenol; para-decylphenol; para-dodecylphenol; the corresponding ortho phenols and their mixtures. The manufacture of thermoplastic, oxyalkylation susceptible, phenol-aldehyde resins, which can be used as intermediates to produce the products of the present invention, particularly from formaldehyde and a difunctional phenol, i.e. a phenol in which one of the reactive positions (2, 4, 6) has been substituted by a hydrocarbon group and particularly by one having at least 4 carbon atoms and not more than 15 carbon atoms, is well-known and usually include temperatures of about 50 to 250° C. at atmospheric, reduced or elevated pressures.

The alkylene oxides which may be used to react with the phenol-aldehyde resin are the alpha-beta oxides having not more than 4 carbon atoms, i.e. ethylene oxide, alpha-beta propylene oxide, alpha-beta butylene oxide, glycidol and methylglycidol. Having obtained a suitable resin of the kind described, such resin is subjected to treatment with a reactive olefin oxide. The oxyalkylation of the resins of the kind from which the initial reactants used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as about 200° C. or more. The reaction may be conducted with or without pressure, i.e. from zero pressure to approximately 200 or even 300 p.s.i.g. or more. In general, the method employed is substantially the same procedure as used for oxyalkylation of other organic materials having reactive phenolic groups. It is advantageous to conduct the oxyalkylation in the presence of an inert solvent such as xylene, cymene, Decalin, ethylene glycol diethylether, diethylene glycol, diethylether, or the like, although with many resins, the oxyalkylation proceeds satisfactorily without a solvent. This is particularly true in the manufacture of products from low-stage resins, i.e. up to about 7 units per molecule.

Suitable fatty monocarboxylic acids for use in this invention have at least about 6 carbon atoms, and the preferred group of fatty acids have about 12 to 20 carbon atoms. The fatty acids include caprylic, pelargonic, capric, undecylic, lauric, myristic, palmitic, stearic and arachidic. Mixtures of fatty acids having at least 6 carbon atoms obtained from the saponification of fats and fatty oils for example may be employed. Naphthenic acids and hydrofol acids (hydrogenated fish oil fatty acids) are also suitable fatty acids. When the fatty acid has less than about 8 carbon atoms the ester tends to have less solubility in lubricating oils. The solubility of the ester increases as the length of the fatty acid chain increases. Accordingly, the fatty acid preferably has at least about 12 carbon atoms.

The esters of the reaction product of the condensation of a phenol-aldehyde resin with an alkylene oxide are useful as deposit-control additives in lubricants. The oil base of lubricating viscosity in which the additives may be used to form superior lubricants includes mineral oils, synthetic lubricating oils and mixtures thereof. The hydrocarbon lubricating oils usable in this invention can be paraffin base, naphthenic base or mixed paraffin-naphthene base distillate or residual mineral or petroleum oils. Paraffin base distillate lubricating oil fractions can be used in the formulation of premium grade motor oils. The lubricating base generally is subjected to solvent refining to improve its lubricity and viscosity temperature relationship as well as solvent dewaxing to remove waxy components and improve the pour of the oil. Preferably, lubricating oils having an SUS viscosity at 100° F. between about 50 and 1000 may be used in the formulation of the improved lubricants of this invention and often the viscosity range falls between about 70 and 300 at 100° F.

Among the synthetic lubricating bases useful in this invention are the ester or ether type. High molecular weight, high boiling, liquid aliphatic dicarboxylic acid esters possess excellent viscosity-temperature relationships and lubricating properties and are finding ever-increasing utilization in lube oils adapted for high and low temperature lubrication; esters of this type are used in the formulation of jet engine oils. Examples of this class of synthetic lubricating bases are the diesters of acids such as sebacic, adipic, azelaic, alkenyl succinic, etc.; specific examples of these diesters are di-2-ethylhexyl sebacate, di-2-ethylhexyl azelate, di-2-ethylhexyl adipate, di-n-amyl sebacate, di-2-ethylhexyl-2-dodecyl succinate, di-2-ethoxyethyl sebacate, di-2'-methoxy-2-ethoxyethyl sebacate (the methylcarbitol diester), di-2'-ethyl-2-n-butoxyethyl sebacate (the 2-ethylbutyl Cellosolve diester), di-2-n-butoxyethyl azelate (the n-butyl Cellosolve diester) and di-2'-n-butoxy-2-ethoxyethyl-n-octyl succinate (the n-butyl Carbitol diester).

Polyester lubricants formed by a reaction of an aliphatic dicarboxylic acid, a glycol and a monofunctional aliphatic monohydroxy alcohol or an aliphatic monocarboxylic acid in specified mole ratios are also employed as the synthetic lubricating base in the compositions of this invention. Polyesters formed by reaction of a mixture containing specified amounts of dipropylene glycol, sebacic acid and 2-ethyl-hexanol and a mixture containing adipic acid, diethylene glycol and 2-ethyl-hexanoic acid illustrate the class of synthetic polyester lubricating bases.

Polyalkylene ethers as illustrated by polyglycols are also used as the lubricating base in the compositions of this invention. Polyethylene glycol, polypropylene glycol, polybutylene glycols and mixed polyethylene-polypropylene glycols are examples of this class of synthetic lubricating bases.

The sulfur analogs of the above-described diesters, polyesters and polyalkylene ethers are also used in the formulation of the lubricating compositions of this invention. Dithioesters are exemplified by di-2-ethylhexyl thiosebacate and di-n-octylthioadipate; polyethylene thioglycol is an example of the sulfur analogs of the polyalkylene glycols; sulfur analogs of polyesters are exemplified by the reaction product of adipic acid, thioglycol and 2-ethylhexyl mercaptan.

The lubricating oils usually contain other additives designed to impart other desirable properties to it; for example, V.I. improvers such as the polymethacrylates; wear inhibitors, pour point depressants, corrosion inhibitors and oxidation inhibitors which will function in combination with the esters of this invention.

The ester additives of the present invention can be prepared as shown in the following example.

Into a reaction vessel equipped with a thermometer, reflux condenser, and stirrer was placed 2 moles of t-octyl phenol and 135 grams (1.67 moles) of formalin. The reaction was catalyzed by the addition of 0.6 gram of concentrated sulfuric acid dissolved in 20 ml. of water. The mixture was heated under reflux for one hour and the calculated amount of calcium oxide was added to neutralize the sulfuric acid present. The flask was then converted to a distillation system and the mixture was dehydrated in vacuo (30 mm.) to a pot temperature of 180° C. The product was cooled to 100° C. and poured into a stainless steel beaker, where it solidified to a colorless, transparent resin.

One hundred and eighty grams of the above resin was placed in an autoclave with 0.5 gram of powdered KOH. Two hundred and forty-eight grams of propylene oxide was added to the mixture and the autoclave was sealed. The mixture was heated to 300° F. and a pressure of 190 p.s.i.g. In one hour the pressure dropped to 0.0 p.s.i.g. and the autoclave was opened. A very viscous, almost colorless, polymer was obtained which did not behave as a dispersant (according to carbon black suspension tests).

Two hundred and six grams of the above propylene oxide condensation product was placed in a flask containing 119.4 grams of methyl stearate and 3.25 grams of tetraisopropyl titanate. The mixture was heated at 200° C. under a stream of nitrogen until a total of 9 grams of methyl alcohol was collected. The reaction mixture was then heated under vacuum at 200° C. for 15 hours. The resulting product was a straw-colored, mobile liquid which was completely soluble in mineral lubricating oil. A one percent blend of this additive in the mineral lubricating oil showed the following properties:

| | |
|---|---|
| K.V. at 100 | 36.12 |
| K.V. at 130 | 18.50 |
| K.V. at 210 | 5.56 |
| Pour ° F. | 5 |
| V.I | 99.5 |

*Carbon Black Suspension Test*

A carbon black suspension test was conducted by dissolving 1 gram of the ester in 100 ml. of a 50:50 mixture of the mineral lubricating oil and kerosene containing 0.5 g. of carbon black. After homogenizing the mixture through a manually operated homogenizer and heating to 150° C. it was allowed to stand at room temperature.

After several weeks the carbon black still remained in suspension. When the test was made on a blank lube oil-kerosene mixture containing none of the polyester additive, the carbon black remained in suspension for only a few hours.

The ester additives of this invention are added to the lubricating oils in amounts sufficient to impart solid-dispersant properties to the oils and usually are about 0.1 to 10% of the oil, preferably about 0.5 to 2%. Thus, as specific examples, 1% of the additive of the above example can be added to a solvent refined Mid-Continent lube oil of 100 SUS at 100° F. viscosity or to di-2-ethyl-hexylsebacate synthetic oil.

I claim:

1. An oleaginous lubricant composition consisting essentially of a mineral oil of lubricating viscosity and about 0.1 to 10% of the oil to maintain in suspension sludge and varnish formed during use of said lubricant composition in an internal combustion engine of an oil-soluble polymer consisting essentially of an ester of an oxyalkylated phenol-formaldehyde resin wherein said oil-soluble polymer has the formula:

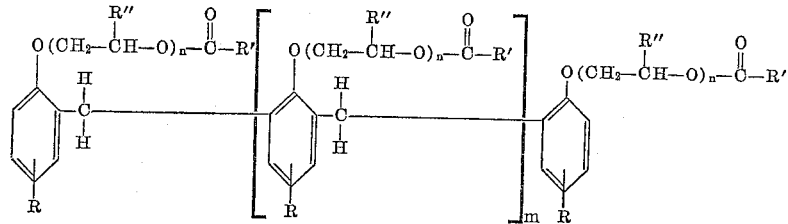

wherein: $n$=about 1 to 10; $m$=about 0 to 10; R=alkyl group, of about 4 to 15 carbon atoms; R'=alkyl group of about 11 to 19 carbon atoms, and R'' is selected from the group consisting of hydrogen and an alkyl radical of 1 to 2 carbon atoms.

2. The lubricant composition of claim 1 wherein the ester additive is present in the mineral oil in an amount of about 0.5 to 2% of the oil.

3. The composition of claim 1 wherein R'' is methyl.

References Cited in the file of this patent

UNITED STATES PATENTS

| | | |
|---|---|---|
| 2,499,360 | De Groote et al. | Mar. 7, 1950 |
| 2,499,363 | De Groote et al. | Mar. 7, 1950 |
| 2,499,364 | De Groote et al. | Mar. 7, 1950 |